May 23, 1939.  F. H. MARKWICK  2,159,335
MEASURING INSTRUMENT
Filed Dec. 6, 1937  2 Sheets-Sheet 2

INVENTOR
Frederick H. Markwick
BY
Marechal & Noé
ATTORNEY

Patented May 23, 1939

2,159,335

UNITED STATES PATENT OFFICE 2,159,335

MEASURING INSTRUMENT

Frederick H. Markwick, Dayton, Ohio, assignor to The Sheffield Gage Corporation, Dayton, Ohio, a corporation of Ohio Application December 6, 1937, Serial No. 178,289

2 Claims. (Cl. 33—147)

This invention relates to measuring or gauging devices and the like.

One object of the invention is the provision of a gauging device in which there is a gauging member adapted for cooperation with the work, the device having an extension adapted to be interposed between the work and the gauging member and capable of being readily moved from an operative to an inoperative position.

Another object of the invention is the provision of a gauging device of the character mentioned including a gauging member having a gauging point adapted for cooperation with the work, an additional member being provided so that it may be readily interposed between the gauging point and the work and having a work contacting end which is flat so that it may be used for measuring work pieces where the part it engages is round or convex in form.

Another object of the invention is the provision of an attachment for a gauge having a gauging member provided with a gauging point, the attachment being of such character that it may be readily connected to a gauging instrument to adapt the instrument for cooperation with a work specimen where the engaged part of the work specimen is rounded at the point of engagement.

Other objects and advantages of the invention will be apparent from the following description, the appended claims and the accompanying drawings in which:

Figure 1:
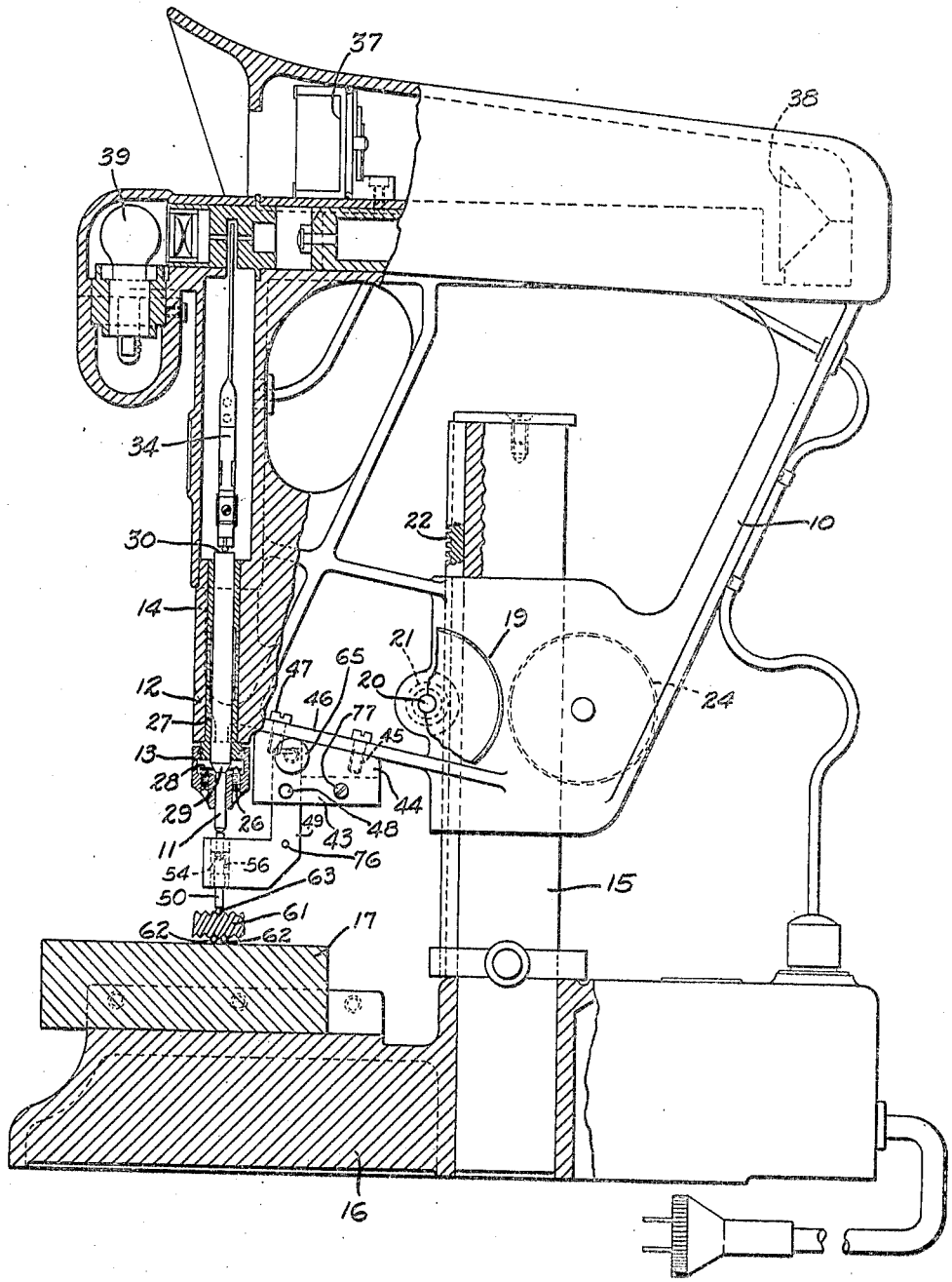
Fig. 1 is a side elevation, partly in section, showing a gauging device embodying the present invention.
Figure 2:
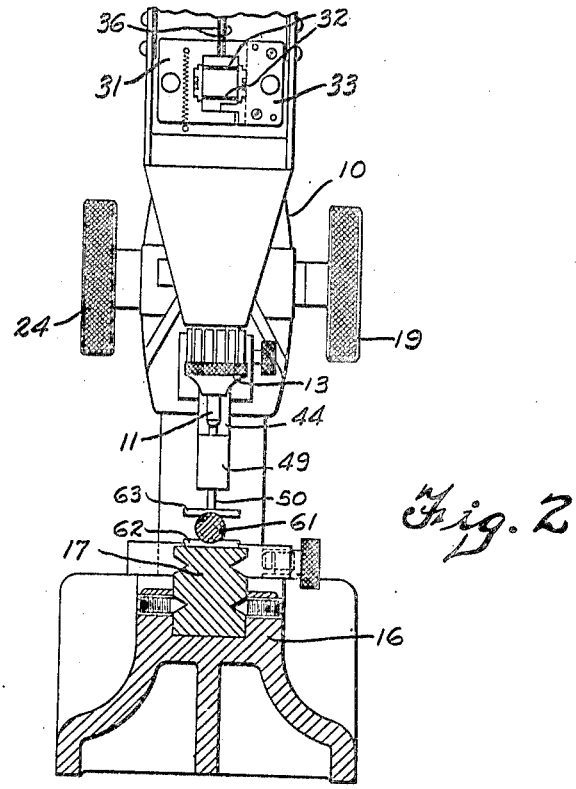
Fig. 2 is a front elevation, shown partly in vertical section, of the lower portion of the gauging device.

Referring more particularly to the drawings by reference numerals, 10 designates a gauging or measuring instrument having a movable gauging member 11 which is adapted for axial movement in a support generally designated by the reference numeral 12. This support includes a holding member 13 and a housing 14 on which the holding member is held and in which gauging mechanism of any suitable character is supported. The housing 14 is adapted for vertical movement on a supporting post 15 which extends upwardly from the base 16 having a work support 17. Vertical movements of the housing are effected by rotating a hand wheel 19 which is fixed to a shaft 20 on which is a pinion 21 meshing with rack teeth 22 on the post 15. The shaft 20 is rotatably carried by the housing 14. Suitable clamp means operated by hand wheel 24 is provided for holding the housing in any position of adjustment on the post.

As herein shown for exemplary purposes, the work gauging member 11 is a plunger which is vertically slidable in a sleeve 27 having a fixed position in the housing 14. The lower end of the sleeve 27 rotatably supports the holding member 13 which is provided with a transversely extending spring steel plate 28 having a rectangular hole in which the tapered portion 29 of the plunger rests. This tapered portion 29 of the plunger 11 is of rectangular cross-section and fits in the hole in the plate 28 so that when the holding member 13 is rotated the plate 28, which is supported on the pointed end of an adjusting screw 26, moves with it and rotates the plunger 11 about its own axis. The upper end of the plunger has an inclined surface 30 engaging the lower end of a vertically movable block 31 which is carried by flexible spring plates 32 extending from a fixed block 33, the construction being such that the block 31 may move vertically to swing an arm or pointer 34 which is connected to the two blocks 31 and 33 by means of two spaced flexible spring blades 36. The position of the arm 34 is indicated on a scale 37 by means of an optical system including a reflecting prism 38 in front of the light source 39 which throws a visible indication upon the scale 37 of the position of the pointer 34, thus giving a reading on the scale in accordance with the position of the plunger 11.

Figures 3, 4:
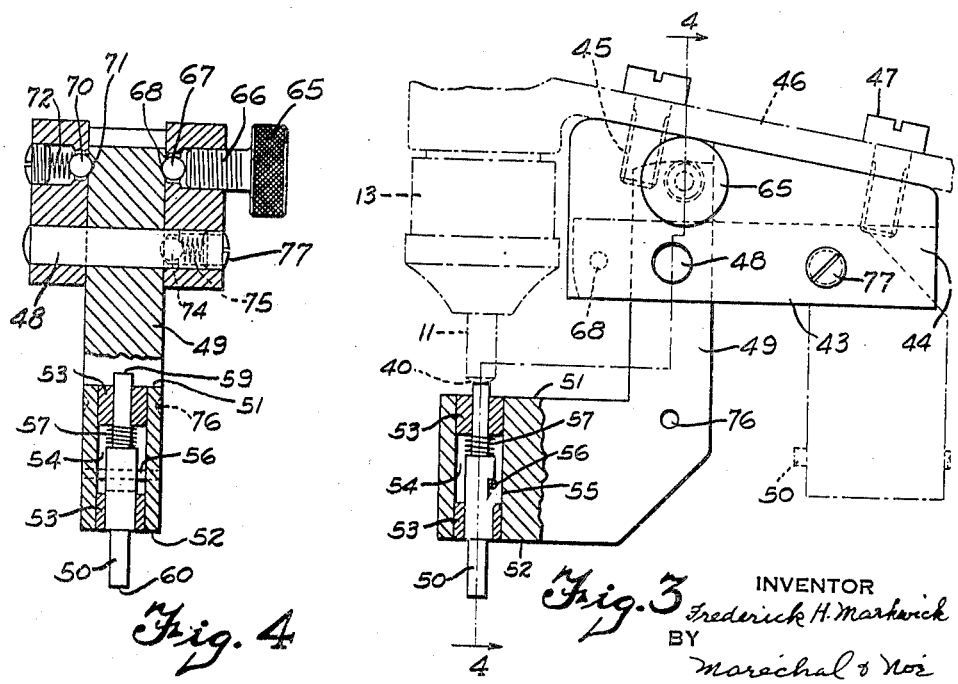
Fig. 3 is an enlarged side elevation of the gauging attachment.
Fig. 4 is a vertical section taken on the line 4—4 of Fig. 3.

The plunger 11 has a rounded hard work contacting point 40 as shown in Fig. 3 so as to be adapted for direct engagement with a work specimen in which the gauged surface is flat or horizontal, it being understood that the gauged specimen is placed on the work support 17 and engaged by the lower end of the plunger 11 so that if the work specimen is larger or smaller than a standard piece the difference in size will be indicated by comparing the indications obtained on the scale when using the standard piece and when checking the work specimen.

Removably secured to the housing of the gauging device is an attachment 43 of such character as to adapt the gauging device to gauge or compare parts where the part engaged is a rounded surface, the gauging attachment also providing an extension which may be conveniently moved to operative and inoperative positions so as to provide an extension plunger in alignment with the plunger 11 and between the plunger 11 and a work specimen placed on the work support 17.

The attachment 43 comprises a cast metal block 44 having threaded passages 45 so that it may be detachably supported on the lower wall 46 of the housing 14 by means of attaching screws 47. It is preferably arranged, as shown, in back of the holding member 13 and in back of the plunger 11 where it will not interfere with a gauging operation in which the point of the plunger 11 is brought into direct contact with the work specimen. Movably supported on the block 44, preferably by means of a pivot pin 48, is an arm 49 which, in its normal operative position, extends downwardly and adjacent the plunger 11 and provides a mounting for a movable work contacting means shown as a plunger 50 which projects from the upper and lower surfaces 51 and 52 of the arm end. The plunger 50 is guided for axial movements in guide sleeves 53 which are pressed in a passage 54 in the arm end. One side of the plunger has a recess 55 cooperating with a pin 56 extending through and fixed in the end of the arm 49 so as to limit the travel of the plunger 50 and prevent it from falling from the arm. Spring means 57 urges the plunger downwardly in a yielding manner.

The upper end of the plunger 50 has a flat transverse surface 59 adapted for engagement with the lower end of the plunger 11. The lower end of the plunger 50 is also provided with a transversely extending flat work engaging surface 60 so that it may be conveniently used with a work piece having a rounded or convex surface. It may be used, for example, in measuring or comparing screw threads. A threaded work piece 61 may be placed on two round bars 62 with a single round bar 63 positioned on top of the work piece, the bars 62 and 63 being of such size as to engage the thread sides at suitable points so that the diameter of the threads can be checked by comparing with a standard threaded piece on which the same bars 62 and 63 are used, or checked by setting with a master or distance block. With the lower end of the plunger 60 having a flat transverse surface, it will be apparent that great care or accuracy in exactly centering the bar 63 with respect to the axis of the plunger 60 need not be exercised.

The bar 49, when in its operative position, is held rigidly in place so that the upper end of the plunger 50 yieldingly contacts the lower end of the plunger 11, which is forced upwardly a very slight amount by the plunger 50 when the latter is in its lowermost position. The means for fixing the arm 49 securely in place preferably comprises an adjustable knob 65 having a threaded portion 66 screwed into the block 44. The inner end of the threaded portion 66 may be moved against a locating ball 67 so as to force the same into a notch 68 in the bar 49, so located that when the ball 67 is forced against it, the axis of the plunger 50 is in vertical alignment with the plunger 11. When the knob 65 is turned to release the pressure on the ball 67, the arm may be swung about its pivot pin 48. Opposite the ball 67 is a second ball 70, yieldingly held against the notch 71 in the arm by means of a spring 72. The pressure of the ball 70 may be readily overcome after the knob 65 is released, to permit swinging of the arm 49. Arm 49 may thus be readily swung by the operator, after he releases the knob 65, and moved to the position indicated in dotted lines in Fig. 3 in which the plunger 50 is arranged horizontally well back of the gauging member 11 where it permits the latter to be engaged directly with work on the work support 17. The arm 49 is preferably held in its inoperative position by yielding means on one or both sides of the arm. As shown this yielding means comprises a ball 74 urged yieldingly by spring 75 into a conical recess 76 provided in the arm. A screw 77 holds the spring 75 in place and applies sufficient pressure to the spring 75 so that the ball 76 holds the arm against gravity, but permits the arm to be manually moved by the operator at any time.

It will thus be seen that the attachment provides a simple means for increasing the effective adaptations and use of a gauging instrument, as the extension plunger 50 may be very readily moved by the operator into operative and inoperative positions. When moved to its operative position, with the housing 14 raised upon the supporting post 15 to accommodate the increased distance required between the lower end of the plunger 11 and the work contacted, the gauging device is adapted for checking threads or work pieces of round form. In its inoperative position the arm 49 extends out of the way just below the wall 46 of the housing, with the lower projecting portion of the arm extending downwardly at a considerable distance remote from the plunger and the part of the housing on which this plunger is carried.

While the form of apparatus herein described constitutes a preferred embodiment of the invention, it is to be understood that the invention is not limited to this precise form of apparatus; and that changes may be made therein without departing from the scope of the invention which is defined in the appended claims.

What is claimed is:

1. A gauging device of the character described comprising a support, an axially movable gauging member movable in said support, gauging mechanism carried by said support and operated by said gauging member, said support having a portion for holding a work specimen, an arm extending adjacent the gauging member, a plunger mounted for axial movement in said arm in line with said gauging member and having one end engaging said gauging member and the other end adapted for engagement with the work, a spring for urging said plunger yieldingly away from the gauging member, and means pivotally mounting said arm on said support for movement about an axis extending transversely of the axis of said plunger and providing for ready withdrawal of the plunger from alignment with the gauging member to provide for engagement of said gauging member with the work.

2. A gauging device of the character described comprising a support, a gauging member vertically movable in said support, gauging mechanism carried by said support and operated by said gauging member, said support having a portion below said gauging member for holding a work specimen, an arm pivoted for movement on a horizontal axis on said support and having a portion extending below said gauging member in the operative position of said arm, a plunger mounted for vertical movement in said arm in line with and below said gauging member and having its upper end engaging said gauging member and its lower end adapted for engagement with the work, said arm being pivotally movable from an operative position to an inoperative position in which said plunger is arranged substantially horizontally remote from said gauging member.

FREDERICK H. MARKWICK.